United States Patent
Berge (10) Patent No.: US 7,520,306 B1
(45) Date of Patent: Apr. 21, 2009

(54) TREE REMOVER

(76) Inventor: Albert M. Berge, 51448 Whippoorwill Rd., Bemidji, MN (US) 56601

( * ) Notice: Subject to any disclaimer, the term of this patent is extended or adjusted under 35 U.S.C. 154(b) by 643 days.

(21) Appl. No.: 11/173,418

(22) Filed: Jul. 1, 2005

Related U.S. Application Data (60) Provisional application No. 60/585,463, filed on Jul. 1, 2004.

(51) Int. Cl.
*A01G 23/06* (2006.01)
(52) U.S. Cl. ............... 144/334; 144/24.12; 144/4.1; 37/302
(58) Field of Classification Search ............ 144/4.1, 144/34.1, 24.12, 334, 335; 37/302; 172/699, 172/720, 777
See application file for complete search history.

(56) References Cited

U.S. PATENT DOCUMENTS

| | | | |
|---|---|---|---|
| 686,153 A | 11/1901 | Smith |
| 831,715 A | 9/1906 | Franks |
| 1,907,288 A | 5/1933 | Rarig |
| 2,187,707 A | 1/1940 | Kane |
| 2,281,928 A | 5/1942 | Fletcher |
| 2,439,743 A | 4/1948 | McEwen |
| 2,536,308 A | 1/1951 | Peirce |
| 2,626,468 A | 1/1953 | Dobrinich, Jr. |
| 2,674,818 A | 4/1954 | Carnes |
| 2,716,823 A | 9/1955 | Mullin |
| 2,746,492 A | 5/1956 | De Hardit |
| 2,769,278 A | 11/1956 | Wassell et al. |
| 2,806,682 A | 9/1957 | Ankersheil |
| 2,821,217 A | 1/1958 | Shald |
| 2,835,992 A | 5/1958 | Flemer, III |
| 2,837,844 A | 6/1958 | Launder |
| 2,840,932 A | 7/1958 | Breyer |
| 2,852,875 A | 9/1958 | Bierwith et al. |
| 2,882,622 A | 4/1959 | Howard |
| 2,912,774 A | 11/1959 | McRary |
| 2,932,100 A | 4/1960 | Goethe |
| 2,934,109 A | 4/1960 | Bles |
| 2,985,973 A | 5/1961 | Struemph |
| 3,004,570 A | 10/1961 | Clayton et al. |
| 3,033,253 A | 5/1962 | Purdy |
| 3,044,192 A | 7/1962 | Moore |
| 3,084,727 A | 4/1963 | Basham |
| 3,120,281 A | 2/1964 | Peveler et al. |
| 3,143,813 A | 8/1964 | Wells |
| 3,215,174 A | 11/1965 | Billings |
| 3,283,426 A | 11/1966 | Payne |

(Continued)

*Primary Examiner*—Shelley Self
(74) *Attorney, Agent, or Firm*—Albert W. Watkins (57) ABSTRACT

A tree and stump remover, suitable for use on skid-steer or similar vehicles, has a coupling operative with standard bucket mounts. Forward and generally centrally protruding from the coupling is a knife with teeth, serrations, or hooks. In alternative embodiments, the teeth, serrations, or hooks may move relative to each other, or be fixedly mounted. Knife support plates extend the width of the apparatus, and are provided for engagement with the base of a tree. In one preferred embodiment, additional smaller spikes extend adjacent to and spaced from the knife, which further facilitate cutting roots and toppling a tree in a single movement. A process of removing trees and stumps using the preferred apparatus includes cutting the roots extending away from the stump or tree from at least a first side, lifting or toppling the remaining root bundle, and shaking or piercing the root bundle to release dirt retained therein.

14 Claims, 5 Drawing Sheets

U.S. PATENT DOCUMENTS

| | | |
|---|---|---|
| 3,289,331 A | 12/1966 | Freeman |
| 3,295,612 A | 1/1967 | Mayo et al. |
| 3,325,927 A | 6/1967 | Mullin |
| 3,326,009 A | 6/1967 | Gagne |
| 3,326,010 A | 6/1967 | Gagne |
| 3,351,108 A | 11/1967 | Hammonds |
| 3,415,296 A | 12/1968 | Frankenberg et al. |
| 3,534,487 A | 10/1970 | Arnaz |
| 3,777,500 A | 12/1973 | Kelley |
| 3,809,135 A | 5/1974 | Dove |
| 3,887,015 A | 6/1975 | Kelley |
| 4,018,255 A | 4/1977 | Diggs |
| 4,094,348 A | 6/1978 | Wolf |
| 4,676,013 A | 6/1987 | Endo |
| 4,771,670 A | 9/1988 | Woerman |
| 4,903,418 A | 2/1990 | Loudon |
| 5,692,875 A * | 12/1997 | Boman ............ 414/725 |
| 5,901,477 A | 5/1999 | Weaver |
| 5,901,479 A | 5/1999 | Langdon |
| 5,909,714 A | 6/1999 | Stoner |
| 5,950,699 A | 9/1999 | Dove |
| 6,308,440 B1 | 10/2001 | Mueller |
| 6,401,831 B2 | 6/2002 | Bouchard |
| 6,439,279 B1 | 8/2002 | Underwood |
| 6,561,108 B2 | 5/2003 | Fisher |

* cited by examiner

TREE REMOVER

CROSS REFERENCE TO RELATED APPLICATIONS

This application claims priority to U.S. provisional patent application Ser. No. 60/585,463 filed Jul. 1, 2004, entitled "Rip N Tip Tree Remover" and naming the present inventor, the contents which are incorporated herein in entirety by reference.

BACKGROUND OF THE INVENTION

1. Field of the Invention

This invention pertains generally to excavating, and more particularly to land clearing equipment including tree and stump removers. In a preferred manifestation, the invention is an apparatus suitable for rapid mounting on a skid-steer or other motorized earth-moving vehicle, which enables the uprooting of trees or digging of stumps. The apparatus includes a digging element that is generally knife shaped with teeth, serrations, or hooks.

2. Description of the Related Art

The harvesting of trees has origins that are older than recorded time, and likely originate at the origins of man himself. Trees provide a unique source of very long-chain, powerful cellulosic material which man has, since before recorded time, used for many diverse purposes. The long cellulosic fibers provide strength across large distances, while offering some limited flexibility. As a result, there is no material which is in wider use for construction of dwellings, or for the furniture found therein. Likewise, owing to the size and density of a typical tree, and the unique chemical structure of cellulose, there is an incredible amount of energy which may be released during combustion. The by-products from the complete combustion of cellulose are water and carbon dioxide, both which are omni-present and necessary for life. Consequently, trees serve as a vast, renewable source of energy. This energy has been used through all time as a source of heat, for cooking or comfort, but may also be used for commercial and industrial processes as well. There are literally many thousands of uses for trees and wood products today.

In addition to the direct benefit of the tree, there are also times when trees must be harvested not for the wood and wood products, but instead for access to the land. Many forested regions also provide land which is suitable for agricultural development, or for the placement of buildings or other human development. In such cases, not only will the above-ground portion of the tree be removed, but so will the stump. When land is cleared of both tree and stump, the soil may then be worked towards the end objective, without interference from either tree or stump.

In order to obtain the benefits of the tree and/or land, a person must first harvest the tree. In the not-so-distant past of the nineteenth century, this was most commonly done by lumber camps, which had many people that each fulfilled a different function. Saws were used to cut the tree, and axes to chop and direct the fall of a tree. Such technique is still used today, though the manual saws have been almost entirely replaced by gasoline powered chain saws. As those familiar with the history of lumber camps know, this was one of the most dangerous professions. Particular arrangements of trees were often referred to as "widow-makers", since controlling the direction of the falling tree could be extremely difficult. Even with the modern chain saw, there is much hazard, not only from the tree, but from the saw as well. Many people are hospitalized each year for injuries that arise while operating a chain saw, some which are serious or life threatening.

As engines were developed and became available on wheeled vehicles, various artisans adopted these vehicles to the lumbering and tree clearing industries. Exemplary of such efforts are U.S. Pat. Nos. 831,715 by Franks; and 1,907,288 by Rarig, the teachings of each which are incorporated herein by reference. These vehicle-mounted tree and brush clearing saws were separately driven by the vehicle engine, and therefore moved in addition to vehicle movement, to replace the manual sawing required in the prior art.

Modern lumbermen no longer rely upon manual methods for the harvesting of trees, and instead utilize very large machinery, equipped with specialized devices that can both grasp and sever the tree at its base. With only a few minutes of time, and with very little risk to the operator, even very large trees may be harvested at their base and then stacked onto a semi-trailer or the like for removal from the forest.

While modern lumbering is almost entirely performed using very large and specialized equipment, artisans have also designed apparatus for the removal of trees using bulldozers and like machinery, most commonly for the purpose of rapidly clearing land but also for lumbering. Bulldozers are commonly used for construction and earth working, and provide a great deal of power and weight. However, they are not well adapted at moving either trees or brush, and so the land is normally first cleared of trees and brush, and then the earth is worked. To facilitate removal of trees and brush, while taking advantage of existing equipment, and either for land clearing or lumbering, a number of bulldozer or vehicle-mounted tree and brush clearing saws have been devised that travel with the vehicle. Exemplary patents, the teachings of each which are incorporated herein by reference, include U.S. Pat. No. 2,769,278 by Wassell et al; U.S. Pat. No. 2,821,217 by Shald; U.S. Pat. No. 3,004,570 by Clayton et al; U.S. Pat. No. 3,033,253 by Purdy; U.S. Pat. No. 3,415,296 by Frankenberg et al; U.S. Pat. No. 3,809,135 by Dove; U.S. Pat. No. 4,018,255 by Diggs; U.S. Pat. No. 5,950,699 by Dove; and U.S. Pat. No. 6,439,279 by Underwood.

While the modern lumber industry equipment is both highly time-efficient and relatively very safe for the operators, lumbermen need not give any consideration to the removal of stumps. The land may simply be replanted, if not naturally then by man, and then allowed to redevelop once more into a forest for future lumber harvests. Consequently, the lumber industry has not been much concerned with the removal of stumps. In contrast, where the land is being cleared for some other use, the tree stump must also be removed. While the foregoing vehicle-supported saws disclose removal of trees and brush, they too fail to disclose the removal of the stumps that will be left behind. These stumps will interfere with the working of the earth, and so should preferably be removed.

To facilitate removal of tree stumps and roots, artisans have developed various additional equipment and attachments. These apparatus would most commonly be used subsequent to the tree and brush clearing, but prior to substantial additional earth working. Such apparatus is illustrated by the following front- and rear-mounted rooters, the teachings of each which are incorporated herein by reference. Exemplary of front mounted rooters are U.S. Pat. Nos. 2,281,928 by Fletcher; 2,674,818 by Carnes; 2,716,823 by Mullin; 2,806,682 by Ankersheil; 2,835,992 by Flemer III; 2,837,844 by Launder; 2,852,875 by Bierwith et al; 2,882,622 by Howard; 2,912,774 by McCrary; 2,932,100 by Goethe; 2,985,973 by Struemph; 3,044,192 by Moore; 3,283,426 by Payne; 3,325,927 by Mullin; 3,887,015 by Kelley; 4,676,013 by Endo;

6,308,440 by Mueller; and 6,401,831 by Bouchard. Exemplary of trailing rooters are U.S. Pat. Nos. 686,153 by Smith; 2,439,743 by McEwen; 3,120,281 by Peveler et al; and 3,295,612 by Mayo et al. Additional patents illustrate various cutting tips and attachments designed to cut parallel to the ground, either attached directly to a bucket or instead. Exemplary of this approach are U.S. Pat. Nos. 2,934,109 by Bles; 3,084,727 by Basham; 3,215,174 by Billings; 3,289,331 by Freeman; 3,351,108 by Hammonds; and 4,094,348 by Wolf, the teachings of each which are incorporated herein by reference.

A number of artisans have proposed various large, vehicle-supported saws that are designed to not only cut through the tree, but also the earth. Exemplary of such technique, the teachings which are incorporated herein by reference, are U.S. Pat. Nos. 3,534,487 by Arnaz; and 2,746,492 by DeHardit. However, powered saws are little match for the rocks and boulders that all too often become entwined within a tree root ball. When such rocks and boulders are encountered, the operator will lose much time and patience, as the saw is repeatedly broken and repaired. Furthermore, while power saws may offer conveniences once the tree is felled, these saws are also very expensive, and also quite dangerous to operate, owing in no small part to the risk of flying debris, including broken chains, teeth or other pieces from the saw.

Rather than pay for the various equipment described herein above, and make the multiple passes through the land to accomplish the desired clearing and stump removal, many persons and companies have instead relied solely upon very large earth working machines, such as bulldozers or the like, typically provided with large plows or blades, much weight, and very large engines, to clear the land. When using a large and powerful machine like a bulldozer, smaller trees may simply be pushed over. For trees too large to directly topple, tree roots are first uncovered by plowing down into the ground, and then the tree is pushed over using the blade. Finally, remaining roots are removed by plowing down into the ground. Unfortunately, as the roots are uncovered, the operator must traverse the same area that has just been uncovered. This means that the hole that was dug to expose the roots acts as a hole that must be driven through to continue with the digging and toppling effort.

As will be appreciated, this "brute force" technique requires very large equipment which is not reasonably owned by most land-owners or even smaller construction companies. Further, even where a company can economically justify such a machine, the transport to and from a job site is, in and of itself, difficult, expensive and somewhat dangerous, due to the large size and weight of the machine. Finally, the relatively larger equipment that is required to remove the tree also requires much open space to operate in, and will disturb large areas of land during the tree removal process.

To attempt to overcome the aforementioned limitations of the prior art, one group of artisans have devised various shovels and scoops which may be attached to various motive equipment. Exemplary of these, the teachings which are incorporated herein by reference, include U.S. Pat. Nos. 4,903,418 by Loudon; 5,901,479 by Langdon; 5,909,714 by Stoner; and 6,561,108 by Fisher. Another group has attempted to provide attachments to the existing shovels that enhance their performance. Such devices include various ripper teeth that are added to the shovel or bulldozer blade, such as the sharp blades illustrated in U.S. Pat. Nos. 2,187,707 by Kane; 5,901,477 by Weaver; 3,143,813 by Wells; and 2,626,468 by Dobrinich, Jr. An additional noteworthy attachment is illustrated in U.S. Pat. No. 2,840,932 by Breyer, entitled "Earth and Material Handling Implement". This patent describes a pointed implement emanating from the center of a front-mounted bulldozer blade, designed for use as a rooter and a tipping implement. As useful as the Breyer concept may be in the tipping of trees, there is nothing provided to assist with the severing or removal of roots, other than the shear power and weight of the vehicle.

SUMMARY OF THE INVENTION

In a first manifestation, the invention is a tree remover. A coupling provides suitable engagement with a motive power source. A knife protrudes from the coupling to define a forward direction of operation as the direction of protrusion. The knife has an irregular sharpened top surface operative to sever tree roots when the knife and coupling are moved in the forward direction of operation against tree roots. The knife and coupling are also pivotal about a horizontal axis parallel to the ground, from a knife ground-engaging position to a position at least parallel to the ground, all while the coupling remains removed from the ground. The tree remover also has a means for operatively engaging a tree during forward movement of the knife, that couples with the tree to transmit the forward motion into the tree.

In a second manifestation, the invention is an apparatus that mounts on earth moving equipment, and provides a forward-oriented generally knife-shaped implement. The apparatus is pivotal about a horizontal axis. According to this manifestation, the improvement comprises a non-smooth edge on the knife-shaped implement being so mounted that the knife-shaped implement may be operated with the plane of the blade in a generally vertical axis.

In a third manifestation, the invention is a method of toppling a tree. According to the method, a longitudinally extensive knife having at least one longitudinally extensive vertically oriented blade, a coupling and a traction member is coupled to a motive power source. The ground is pierced with the longitudinally extensive knife, and the knife is moved through the pierced ground to thereby cut roots extending away from the root bundle of a woody plant. Movement may be pivotal, linear, reciprocating or other suitable motion. Once the roots have been sufficiently severed, the knife is pivoted to raise a tip distal to the motive power source to a higher elevation than during the moving step. The traction member, which may in one embodiment be the knife, is engaged with the woody plant, and movement of the longitudinally extensive knife is continued in the first direction subsequent to the moving, pivoting and engaging steps, thereby toppling the woody plant through contact between traction member and woody plant.

OBJECTS OF THE INVENTION

Exemplary embodiments of the present invention solve inadequacies of the prior art by providing a tree and stump remover suitable for coupling with a skid-steer or similar vehicles. The novel apparatus has a forward and generally centrally protruding knife with teeth, serrations, or hooks. The tree and stump remover is used to cut the roots extending away from the stump or tree, topple the tree, and then shake the remaining root bundle to release dirt retained therein. A first object of the invention is to provide a low-power and direct method of puncturing the soil, severing tree roots and toppling trees and stumps, which is much more efficient than methods of the prior art. A second object of the invention is to provide an apparatus which will enable an operator to safely and easily tip and remove trees and stumps. Another object of the present invention is to provide this apparatus as an attachment for existing skid-steers and similar smaller motive vehicles, thereby substantially reducing the cost of purchase and maintenance of the apparatus, while also improving access to areas that could not be accessed with larger equipment. A further object of the invention is to enable very simple maneuvering of the apparatus to effect the tree tipping and stump removal, thereby reducing the amount of operator skill required and simultaneously increasing the safety of use. Yet another object of the present invention is to eliminate the need for excavating of soil adjacent the tree or stump, and to thereby minimize the size of the hole and disruption of soil as a result of the tree or stump removal. A further object of the invention is to enable, in the same apparatus, the removal of earthen matter from the roots subsequent to tipping.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
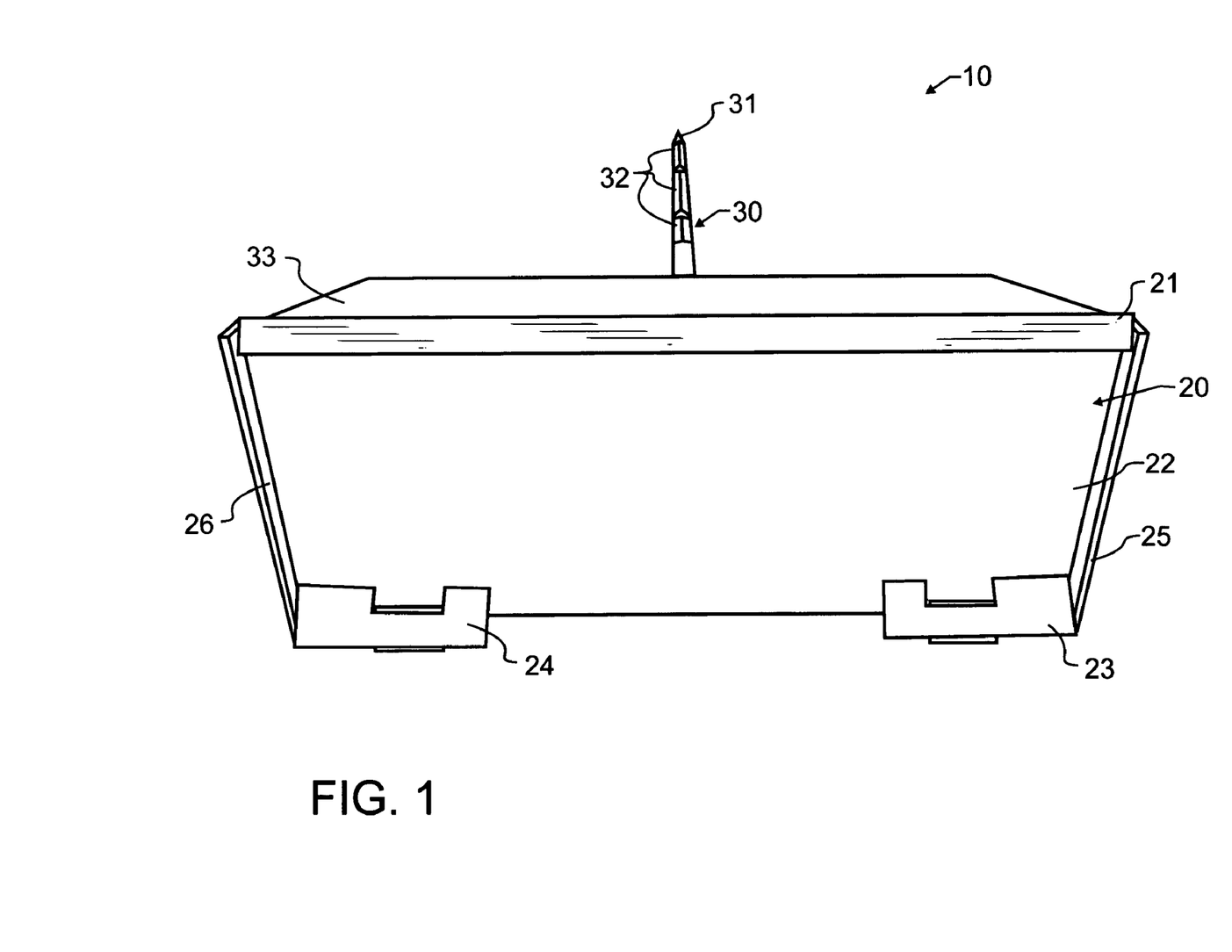
FIG. 1 illustrates a first preferred embodiment tree remover designed in accord with the teachings of the present invention from a rear and top projected perspective view.
Figure 2:
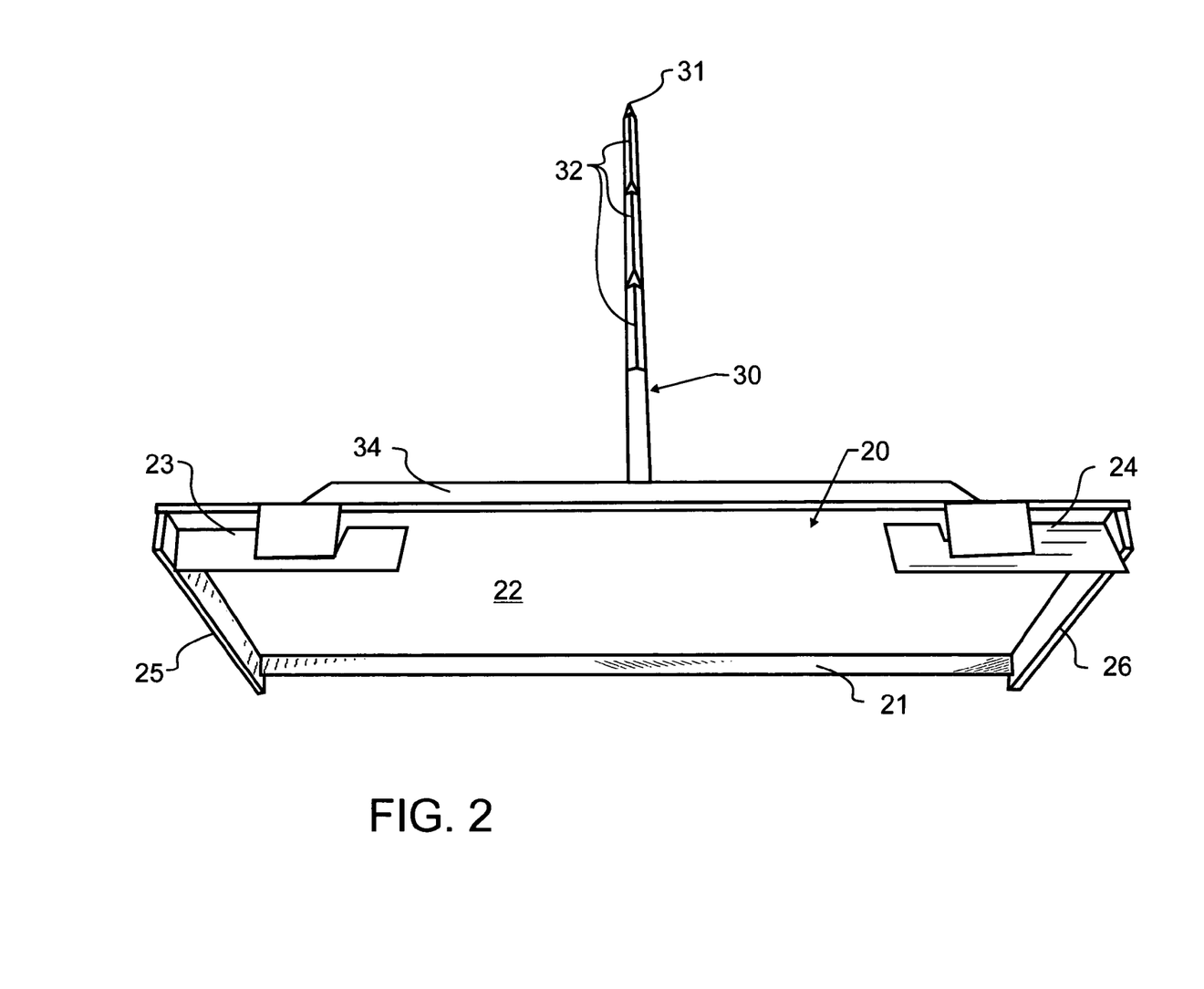
FIG. 2 illustrates the preferred embodiment tree remover of FIG. 1 from a rear and bottom projected perspective view.
Figure 3:
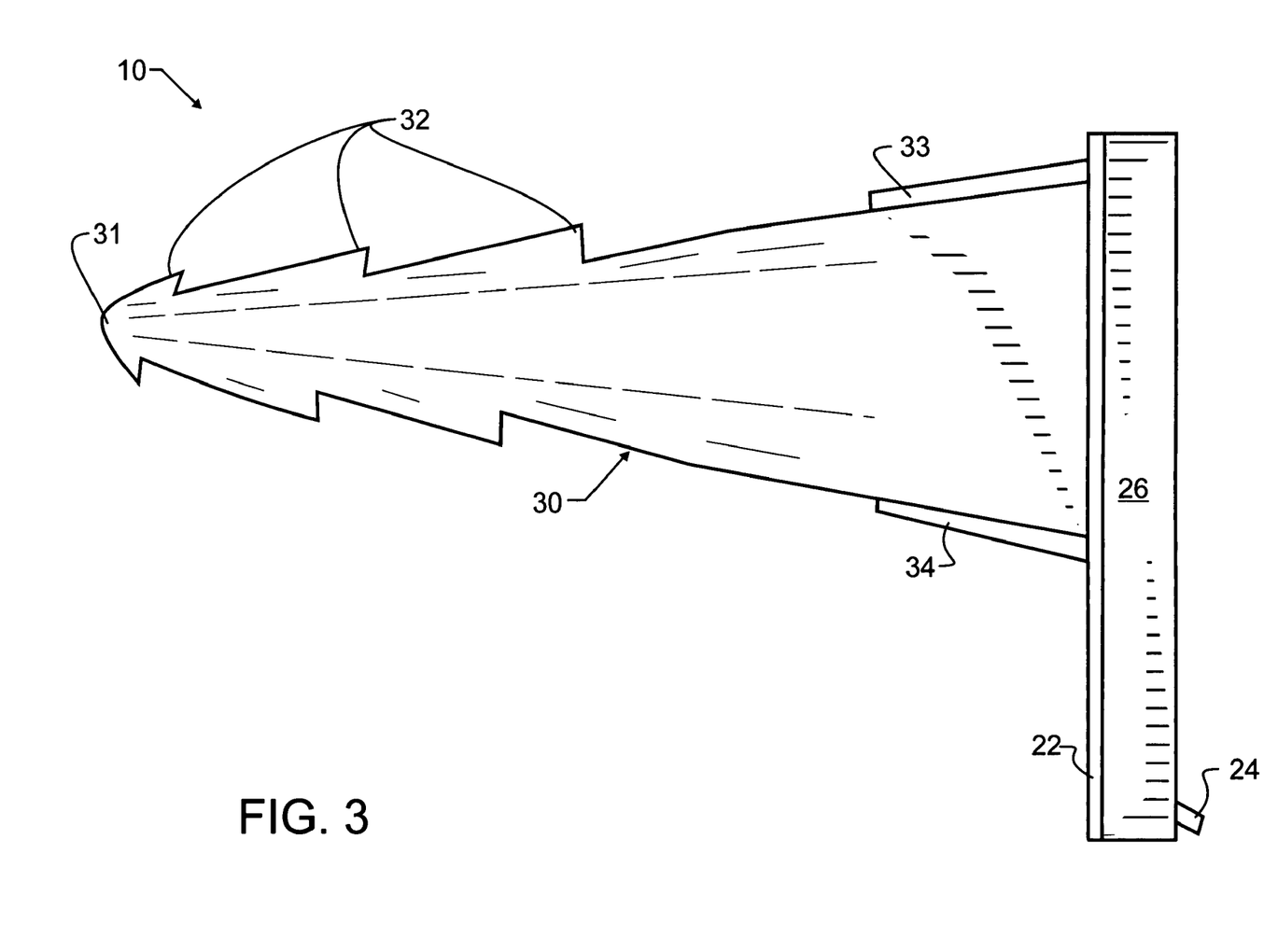
FIG. 3 illustrates the preferred embodiment tree remover of FIG. 1 from a side plan view.

Manifested in the preferred embodiments illustrated herein and each of the alternatives disclosed, implied, or that may readily be recognized by those reasonably skilled in the art, the present invention provides an apparatus and method which overcomes the limitations of the prior art recognized herein above. In demonstration thereof, and as required by and in compliance with the federal patent statutes, FIGS. 1-3 illustrate a first preferred embodiment tree remover apparatus 10, which includes a coupler 20 adapted for quick attachment to and removal from a skid steer or like vehicle. Coupler 20 includes a top lip 21, a flat plate 22, and quick coupler members 23, 24. Sides 25 and 26 complete the coupler. Extending forward from tree remover apparatus 10, in the normal direction of forward travel for a front-mounted attachment, is knife 30. Knife 30 is preferably mounted generally central to tree remover apparatus 10, to permit usage on either or both sides of a tree. It will be recognized, however, that the particular placement of knife 30 with respect to coupler 20 will be determined at the time of design or construction, and is contemplated to be varied from that illustrated and preferred herein.

Knife 30 will most preferably be fabricated from a strong and durable material, such as a thick steel plate or the like, preferably of durable composition and treatment. With suitable material and dimension, knife 30 will endure the forces which may be transmitted through coupler 20 from a machine such as a skid steer. Most preferably, if each of knife 30 and coupler 20 are adequately constructed, they may withstand the maximum forces that are attainable by the machine. While not normally preferred or desirable, it will be recognized that one or more of the components can alternatively be designed to specifically fail upon overload, thereby protecting the remaining components.

Knife 30 most preferably includes teeth 32, which may comprise serrations or other suitable geometry, and will most preferably be sharpened on the top and bottom edges, including and adjacent to teeth 32. At an end of knife 30 distal to coupler 20 is a point 31. Supporting knife 30 on coupler 20, and visible in FIG. 3, are top and bottom transverse plates 33 and 34, which extend forward from plate 22 and which are designed to provide adequate strength to knife 30 to retain knife 30 during heavy use. Transverse plates 33, 34 extend transverse to the direction of knife 30, or transverse to the direction of forward travel discussed herein above. Most preferably, these plates will extend entirely or nearly to the width of plate 22, and will be available then to engage the base of a tree.

In operation, point 31 will be driven into the ground adjacent to a tree, and normally between the tree and vehicle along the axis of forward travel. For exemplary purposes, assume this point to be several feet ahead of the vehicle, and to the right of the tree. Either a pivotal movement of knife 30 relative to horizontal, a forward movement of the vehicle, or both in combination will then cause the sharpened teeth 32 and adjacent edge of knife 30 to sever roots along the right side of the tree, with the serrations acting to sever any roots that try to slide along the blade without cutting. This action is quite similar to that of a serrated knife being drawn across a tomato. Without the teeth 32, a root may simply stretch without cutting.

The pivotal motion referred to will occur on a typical skid-steer about an axis generally parallel to and only slightly displaced from a horizontal axis formed by a line drawn between quick coupler members 23, 24. In a typical operative position, knife 30 will extend into the ground at an approximate 45 degree angle to horizontal, and will be pivoted from that angle towards horizontal during the root severing operation. At least in the case of most skid-steers and other front-end loaders, this pivotal motion uses the strongest components. A loader is designed to scoop and lift, through the very same pivotal motion, very heavy loads within a bucket. Consequently, this movement is most preferred, is capable of severing very large roots, and the present apparatus has been designed to utilize these components and movements. As will be understood, where necessary, the present knife 30 may also be oscillated rectilinearly within the ground, while applying forces to tend to pivot knife 30 upward towards horizontal. Such rectilinear oscillation will produce a sawing effect, in the event roots too large to sever using only pivotal motion are encountered. In either case, the teeth or serrations 32 are very important for the proper severing to occur, and so are most beneficial.

Depending upon the size of the tree and the present apparatus, different operations may be required to remove a tree. It may be possible to simply insert knife 30 directly under the trunk, into the root ball, and then using the aforementioned pivoting motion, simply lift the tree out. For intermediate trees, it may be necessary to pass along one or more sides of the tree. As an example, knife 30 may be used to sever roots along the right side of the tree, and then along the left side of the tree. For even larger trees, a plurality of cuts fully or nearly fully encircling the tree may be required. The specific numbers of root severing cuts that are required will quickly be recognized by an operator based upon such factors as tree size and type, soil conditions, and the size of the preferred embodiment and associated equipment.

Most preferably, the operator will begin to raise tip 31 through a pivotal movement of plate 22 and coupler 20, bringing knife 30 into position more nearly parallel to the ground, or even tilted upward from coupler 20 such that tip 31 is more elevated than, for example, transverse plate 33. If desired, the operator may also continue to travel forward. Additional roots along the right side of the tree will be severed, until knife 30 is full removed from the ground. Once an adequate number of roots have been severed, the operator will decide which portion of tree remover 10 will need to engage with the tree or stump. Where a larger tree is being removed, knife 30 will most preferably be tilted not only from the ground-piercing 45 degree down position to horizontal, but to a tip 31 elevated position such that tip 31 will engage as a traction member with the tree at a very high spot. This gains the greatest leverage to topple the tree. Continued forward movement of the vehicle will then topple the tree.

Where stumps are being removed, it may be possible to, in a single motion, pierce the earth, pivot knife 30 and sever roots, and move forward to engage a traction member with the tree or tree stump. In the case of a stump or shorter tree, continued forward movement of the vehicle will drive transverse plates 33, 34 into the tree. Additional forward movement will then cause the tree stump to tip onto the ground.

As noted, one or more root severing movements may be used. If one pass is not sufficient to tip the tree, a second pass may be made along the other side. In the foregoing example, this would be the left side of the tree. While there may be some occasions where it will be necessary to cut entirely around or more nearly complete cut all or most of the roots, such as with larger trees, in the case of smaller or younger trees only one pass may be required to drop the tree, using a relatively smaller and lighter skid steer.

Figure 4:
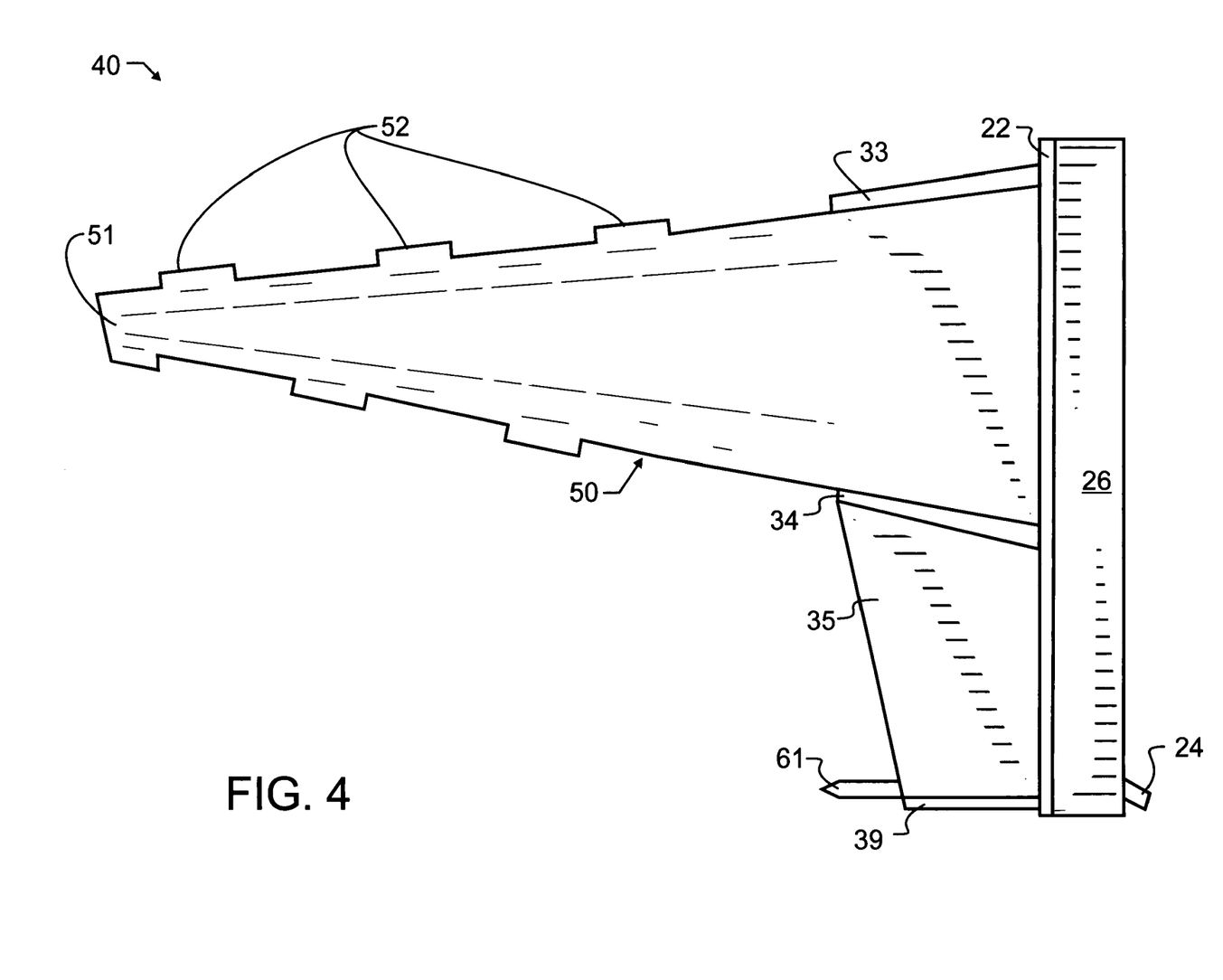
FIG. 4 illustrates a second preferred embodiment tree remover designed in accord with the teachings of the present invention from a side plan view.
Figure 5:
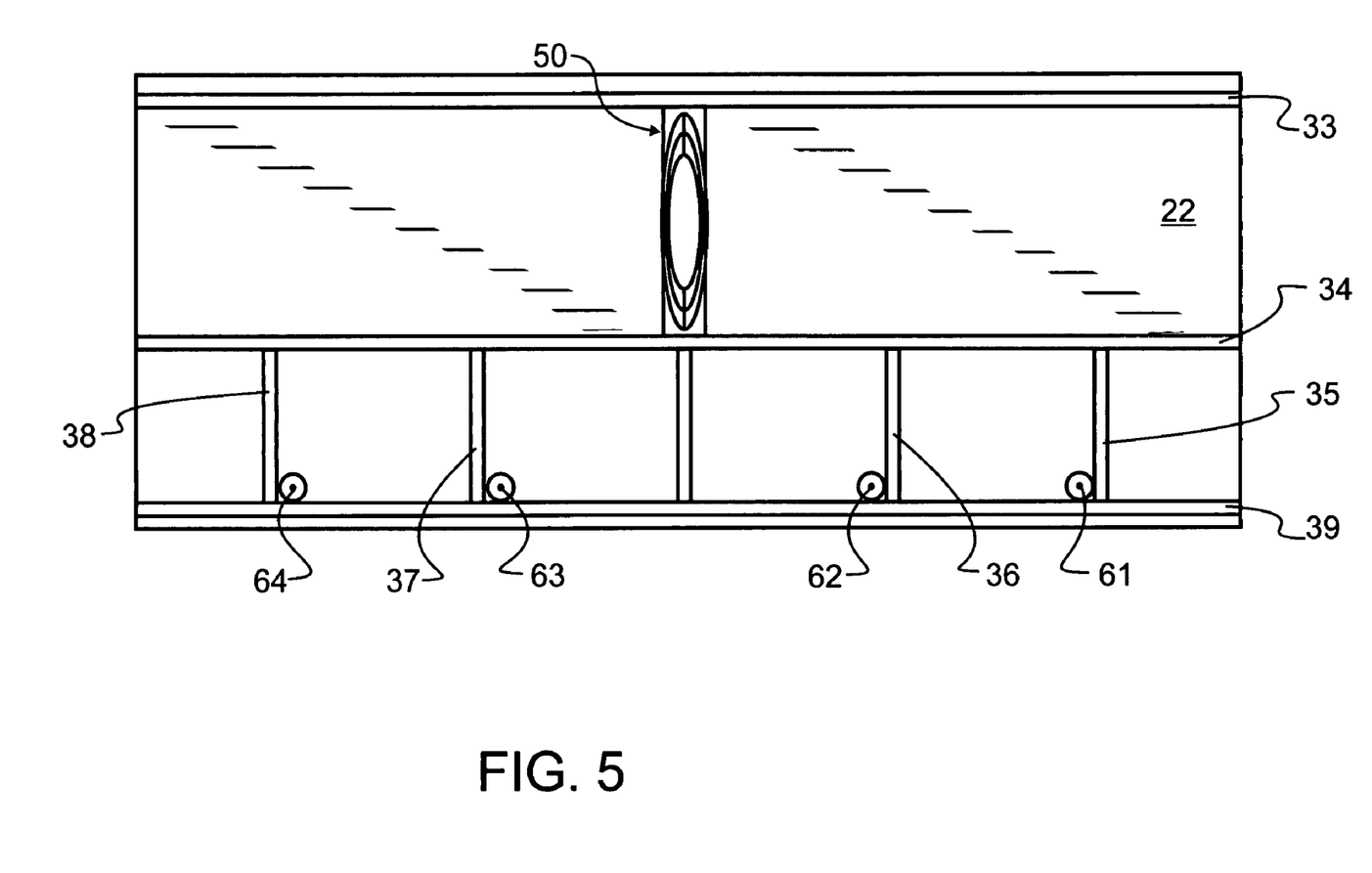
FIG. 5 illustrates the preferred embodiment tree remover of FIG. 4 from a front plan view.

A second preferred embodiment tree remover 40 is illustrated in FIGS. 4 and 5. A like coupler 20 is used, though as aforementioned, any type of suitable coupler may be used to cooperate with a selected machine. Transverse plates 33, 34 are similarly provided, this time supporting a different knife 50 having rectangular teeth 52. While a second preferred geometry for teeth 52 is illustrated, and is felt to provide particular benefit advantage, it will be understood from the present disclosure that, in addition to the geometry of knives 30, 50, other tooth configurations that are known in the various fields of cutlery, saws, woodworking, earth working, and the like may also be provided herewith that accomplish the intended severing. Nevertheless, to facilitate removal, the serrations 32, rectangular teeth 52, or other similar elevated teeth in combination with a sharpened edge are most preferred.

FIGS. 4 and 5 additionally illustrate the incorporation of helper rods 61-64, which in the preferred embodiment are steel rods with pointed tips. It will be understood that other geometries and materials may also be suitable, other than steel rods with pointed tips, as will be apparent from a reading of the present disclosure. Helper rods 61-64, which are spaced from knife 50, will drive into the tree as tree remover 40 is pushed forward, and will assist then with the toppling by coupling greater forces into the tree, while reducing slippage. Further, in the most preferred embodiment, rod 61 will extend slightly forward of rod 62. When a tree is then engaged by rod 61, it will tend to be cradled into contact with rod 62, slightly trapping the tree between rod 61 and knife 50, both which extend farther than rod 62. Likewise, outer rod 64 extends forward farther than rod 63, thereby also cupping a tree between rod 64 and knife 50. This arrangement offers the greatest utility with the removal of a tree stump. In the case of the stump, it is not possible to leverage the tree from a point higher on the trunk. Consequently, all forces must be applied adjacent to the ground. Rods 61-64 pierce the wood, and in so doing produce ample traction to raise and topple the stump.

FIG. 5 illustrates the preferred framework provided to support rods 61-64, though it will be understood that other geometries or techniques may be used. As shown therein, vertical supporting plates 35-38 are provided which extending between transverse plate 34 and a third transverse plate 39. Each of the rods 61-64 may then be supported or nested into an intersection between vertical and transverse plates, thereby providing substantial strength.

Vertical supporting plates 35-38 and any additional plates provided, may also serve a secondary function. These additional plates act as gussets to strengthen transverse plate 34, and in turn reinforce knife 50. Consequently, vertical plates such as 35-38 may be provided not only for support of rods 61-64, but also as structural reinforcement as well.

The exact length of rods 61-64 is not critical to the invention. However, extending rod 61 substantially beyond transverse plate 39 is unnecessary, and will expose the rod to forces that might lead to undesirable bending or fracture. However, rods 61-64 should extend sufficiently to penetrate not only tree bark, but sufficiently into the wood to provide the intended "biting" or traction.

Most preferably, knives 30, 50 extend sufficiently beyond coupler 20 to not only provide adequate cutting distances into the soil, but also to assist with the removal of dirt from the root ball. Once the tree is toppled, it is in many cases very desirable to remove as much dirt and soil as is reasonably possible from the root ball. To effect such removal, knives 30, 50 may be driven into the root ball one or more times. Likewise, where the size of the tree is not so restrictive, the tree removers 10, 40 may be used to lift the tree, once the knife has been inserted into the root ball, and the tree may be shaken about to further loosen the soil. Finally, tree removers 10, 40 may be used to roll the tree or effect further cutting or severing, as may be reasonably practiced. It should be apparent that knife 50 will desirably extend a substantial distance beyond rods 61-64, to permit each of the intended operations.

While the foregoing details what is felt to be the preferred embodiment of the invention, no material limitations to the scope of the claimed invention are intended. Further, features and design alternatives that would be obvious to one of ordinary skill in the art are considered to be incorporated herein. As can be appreciated, the particular materials, geometries and dimensions may be varied within reason by those of reasonable skill in the field. Rather, the scope of the invention is set forth and particularly described in the claims herein below.

I claim:

1. A tree remover, comprising:
  a coupling suitable for operative engagement with a motive power source;
  a knife protruding from said coupling defining a forward direction as the direction of protrusion and having an irregular sharpened top surface operative to sever tree roots when said knife and said coupling are moved against said tree roots and further comprising at least one tooth on said irregular sharpened top surface;
  said knife and coupling pivotal about a horizontal axis parallel to the ground, said coupling and said knife pivotal from a knife ground-engaging position to a position at least parallel to the ground, all while said coupling remains removed from said ground; and
  a means for operatively engaging a tree during forward movement of said knife and coupling to transmit said forward motion to said tree.

2. The tree remover of claim 1 wherein said irregular sharpened top surface is operative to sever tree roots when said knife and said coupling are moved in said forward direction of operation against said tree roots and also when said knife and said coupling are pivoted from said knife ground engaging position to said position at least parallel to the ground.

3. The tree remover of claim 1 wherein said knife further comprises at least one serration on said irregular sharpened top surface.

4. The tree remover of claim 1 wherein said knife further comprises at least one tree-piercing point adjacent to said knife.

5. The tree remover of claim 1 wherein said knife further comprises an irregular sharpened bottom surface.

6. The tree remover of claim 1 wherein said coupling operatively mounts on quick-connect skid-steer bucket mounts.

7. The tree remover of claim 1 wherein said knife is pivotal from a knife ground-engaging position to a position wherein said knife protrudes forward and upward from the ground, whereby a tip of said knife may pierce a tree higher than said coupling.

8. The tree remover of claim 1 wherein said knife is tapered toward multiple edges.

9. A method of toppling a tree, comprising the steps of:
coupling a longitudinally extensive knife having at least one longitudinally extensive and generally vertically oriented blade, a coupling and a traction member to a motive power source;
piercing the ground with said longitudinally extensive knife;
moving said longitudinally extensive knife through said pierced ground and thereby cutting roots extending away from the root bundle of a woody plant, pivoting said longitudinally extensive knife to raise a tip distal to said motive power source to a higher elevation than during said moving step;
engaging said traction member with said woody plant;
continuing movement of said longitudinally extensive knife in said first direction subsequent to said moving, pivoting and engaging steps, and thereby toppling said woody plant through contact between said traction member and said woody plant
wherein said step of moving further comprises moving said longitudinally extensive knife through said pierced ground about a rotary axis and thereby cutting roots extending away from the root bundle of said woody plant.

10. The method of toppling a tree of claim 9 further comprising the steps of raising said root bundle of said woody plant out of the ground, and agitating said root bundle to free dirt from said root bundle.

11. The method of toppling a tree of claim 9 wherein said step of moving further comprises moving said longitudinally extensive knife through said pierced ground in a first direction and in a second direction opposite to said first direction and thereby cutting roots extending away from the root bundle of said woody plant.

12. The method of toppling a tree of claim 9 wherein said step of piercing further comprises pivoting said longitudinally extensive knife about a horizontal axis.

13. A tree remover, comprising:
a coupling suitable for operative engagement with a motive power source;
a knife protruding from said coupling defining a forward direction as the direction of protrusion and having an irregular sharpened top surface operative to sever tree roots when said knife and said coupling are moved against said tree roots and further comprising at least one serration on said irregular sharpened top surface;
said knife and coupling pivotal about a horizontal axis parallel to the ground, said coupling and said knife pivotal from a knife ground-engaging position to a position at least parallel to the ground, all while said coupling remains removed from said ground; and
a means for operatively engaging a tree during forward movement of said knife and coupling to transmit said forward motion to said tree.

14. A tree remover, comprising:
a coupling suitable for operative engagement with a motive power source;
a knife protruding from said coupling defining a forward direction as the direction of protrusion and having an irregular sharpened top surface operative to sever tree roots when said knife and said coupling are moved against said tree roots;
said knife and coupling pivotal about a horizontal axis parallel to the ground, said coupling and said knife pivotal from a knife ground-engaging position to a position at least parallel to the ground, all while said coupling remains removed from said ground; and
a means for operatively engaging a tree during forward movement of said knife and coupling to transmit said forward motion to said tree;
wherein said knife is pivotal from a knife ground-engaging position to a position wherein said knife protrudes forward and upward from the ground, whereby a tip of said knife may pierce a tree higher than said coupling.

* * * * *